(12) United States Patent
Kontsevich (10) Patent No.: US 7,489,804 B2
(45) Date of Patent: Feb. 10, 2009

(54) APPARATUS AND METHOD FOR TRAJECTORY-BASED IDENTIFICATION OF DIGITAL DATA CONTENT

(75) Inventor: Leonid Kontsevich, San Francisco, CA (US)

(73) Assignee: Cognisign LLC, San Francisco, CA (US)

( * ) Notice: Subject to any disclaimer, the term of this patent is extended or adjusted under 35 U.S.C. 154(b) by 375 days.

(21) Appl. No.: 11/535,472

(22) Filed: Sep. 26, 2006

(65) Prior Publication Data

US 2007/0071285 A1     Mar. 29, 2007

Related U.S. Application Data

(60) Provisional application No. 60/720,240, filed on Sep. 26, 2005.

(51) Int. Cl.
*G06K 9/00*     (2006.01)
*H04N 5/225*     (2006.01)

(52) U.S. Cl. ........................... 382/103; 348/169

(58) Field of Classification Search ................. 382/103, 382/107; 348/169, 170, 171, 172, 208.14; 209/631, 638, 639, 640
See application file for complete search history.

(56) References Cited

U.S. PATENT DOCUMENTS 6,529,613 B1*    3/2003    Astle ........................... 382/103
6,744,935 B2*    6/2004    Choi et al. ................... 382/305

OTHER PUBLICATIONS

International Search Report and Written Opinion for International Application No. PCT/US2006/037765, mailed on Jul. 15, 2008, 6 pages.

* cited by examiner

*Primary Examiner*—Abolfazl Tabatabai
(74) *Attorney, Agent, or Firm*—Cooley Godward Kronish LLP (57) ABSTRACT

A computer readable storage medium includes executable instructions to receive an input trajectory of serially selected points of interest within a source digital image. Trajectory mismatch errors are computed between the input trajectory and trajectories within target digital image data. The best target digital image data is selected based upon the trajectory mismatch errors to establish refined target digital image data.

34 Claims, 9 Drawing Sheets

Source Image

Fig. 21

Target Image

Fig. 22

Source Image

Fig. 23

Target Image

APPARATUS AND METHOD FOR TRAJECTORY-BASED IDENTIFICATION OF DIGITAL DATA CONTENT

CROSS REFERENCE TO RELATED APPLICATIONS

This application claims the benefit of U.S. Provisional Application Ser. No. 60/720,240, entitled "A Method for Incremental Adaptive Matching of Serially Selected Points with an Image Database," filed Sep. 26, 2005, the contents of which are hereby incorporated by reference in their entirety. This application is related to the commonly owned and concurrently filed patent application Ser. No. 11/535,469, entitled, "Apparatus and Method for Processing User-Specified Search Image Points", filed Sep. 26, 2006.

BRIEF DESCRIPTION OF THE INVENTION

This invention relates generally to digital data processing. More particularly, this invention relates to the selection of user-specified search points and the trajectory-based processing of the user-specified search points.

BACKGROUND OF THE INVENTION

There are two primary methods for image search and recognition, which can be broadly characterized by matching images based on some important measure(s) of similarity. One method is based on the conversion of images into vector representations, where multi-dimensional coordinates summarize features of an image. These vectors are then organized into one of a few known data structures that allow fast search of the nearest samples in the vector space. When a new source image is received, the source image is converted into vector representation, and the nearest samples from the target database to the vector representation are retrieved. The second method is based on assigning text tags (also known as metatags) to images. Search for similar images in such a database is conducted by text search algorithms that look for common text tags between images.

Both methods have two serious interface-related problems that limit their effectiveness for image search and recognition. The first problem is the inflexibility of these user interfaces to specify the parts of the source image that are important for search or recognition. The tendency of existing approaches to delegate such a decision to the computer application is not a fruitful solution, because the computer cannot read a user's mind. For instance, when a user points at a person in a photograph, no one except the user knows what is more relevant for the image search and recognition task: the person's identity, the person's suit, or perhaps the person's hair color.

The second problem with existing search and recognition methods is that there is no organic way to specify spatial relationships between relevant image parts. By not utilizing this spatial information, matching is less targeted and consequently less accurate. For instance, a person with a green shirt and white pants can be easily confused with a person with a white shirt and green pants.

Existing techniques for image recognition commonly rely upon template matching. In the most straightforward implementation of template matching, an object is represented by a number of templates that represent the object in different sizes and in different orientations. To find this object in an image, all templates are matched with every location in the image. The locations where the match is good up to a certain criterion are considered "hits".

Template matching is prohibitively slow, because it requires matching at all locations and for all templates. Hierarchical matching and contour matching are often mentioned as techniques to expedite template matching. In hierarchical template matching, the template set at a coarse scale is comprised of a few views, which in turn represent clusters of views at a finer scale. Running a relatively fast coarse matching first, finding constraints for the fine scale next, and then running the more accurate fine matching leads to substantial acceleration of the matching process. In the contour matching approach, all templates and the analyzed image are first converted to edge maps, and subsequent matching is done for these maps only. The image contour map first gets blurred in accordance with the so-called chamfer metric, and then all templates get matched with every location in the analyzed image. The advantage of this technique is that matching does not need to be done for the whole area of a template; only the edge points in the template need to be considered. This reduction of the points from area to contours leads to substantial performance gains.

Despite the benefits of the described techniques, the template matching approach remains prohibitively slow because of the combinations of locations, scales and orientations that need to be tested. Moreover, as practice shows, a template set consisting of a few dozen items is often insufficient for describing an object because it should also allow small-to-moderate deformations of those templates, which substantially increases the computational load.

In view of the foregoing, it would be desirable to provide improved techniques for image recognition.

SUMMARY OF THE INVENTION

The invention includes a computer readable storage medium with executable instructions to receive an input trajectory of serially selected points of interest within a source digital image. Trajectory mismatch errors are computed between the input trajectory and trajectories within target digital image data. The best target digital image data is selected based upon the trajectory mismatch errors to establish refined target digital image data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention includes a trajectory based method for matching a source image with target digital image data. The technique does not reply upon templates; instead, it is built around a serial selection of locations in the source image, which can be conceptualized as an input trajectory. The trajectory matching process has two components:

1) selection of a sequence of locations whose features uniquely characterize the analyzed object or scene in the source image to form an input trajectory;
2) finding trajectories in the target digital image data that most closely match the input trajectory.

This approach emphasizes important elements for a given comparison task, such as finding similar image content, and de-emphasizes unimportant elements. The technique is conducive to massively parallel recursive tracking of the input trajectory in the target digital image data. This tracking differs from numerous available tracking methods (such as Kalman filters, particle methods, etc.) in that it simultaneously checks trajectories with different starting points and explores extensions of the existing trajectories in more combinatorial ways. Such a tracking provides high adaptability at low cost compared to template matching methods.

This invention has additional superior features compared to template matching: it is faster; the number of processed trajectories is smaller than the number of processed templates used in template matching; and it is tolerant to various transforms (such as translation, scale, etc.). The major difference between template and trajectory matching methods is that the former rigidly computes instantaneous matches for whole templates, whereas the latter evolves in time in a highly adaptable way as new points of interest are incorporated into the input trajectory.

Figure 1:
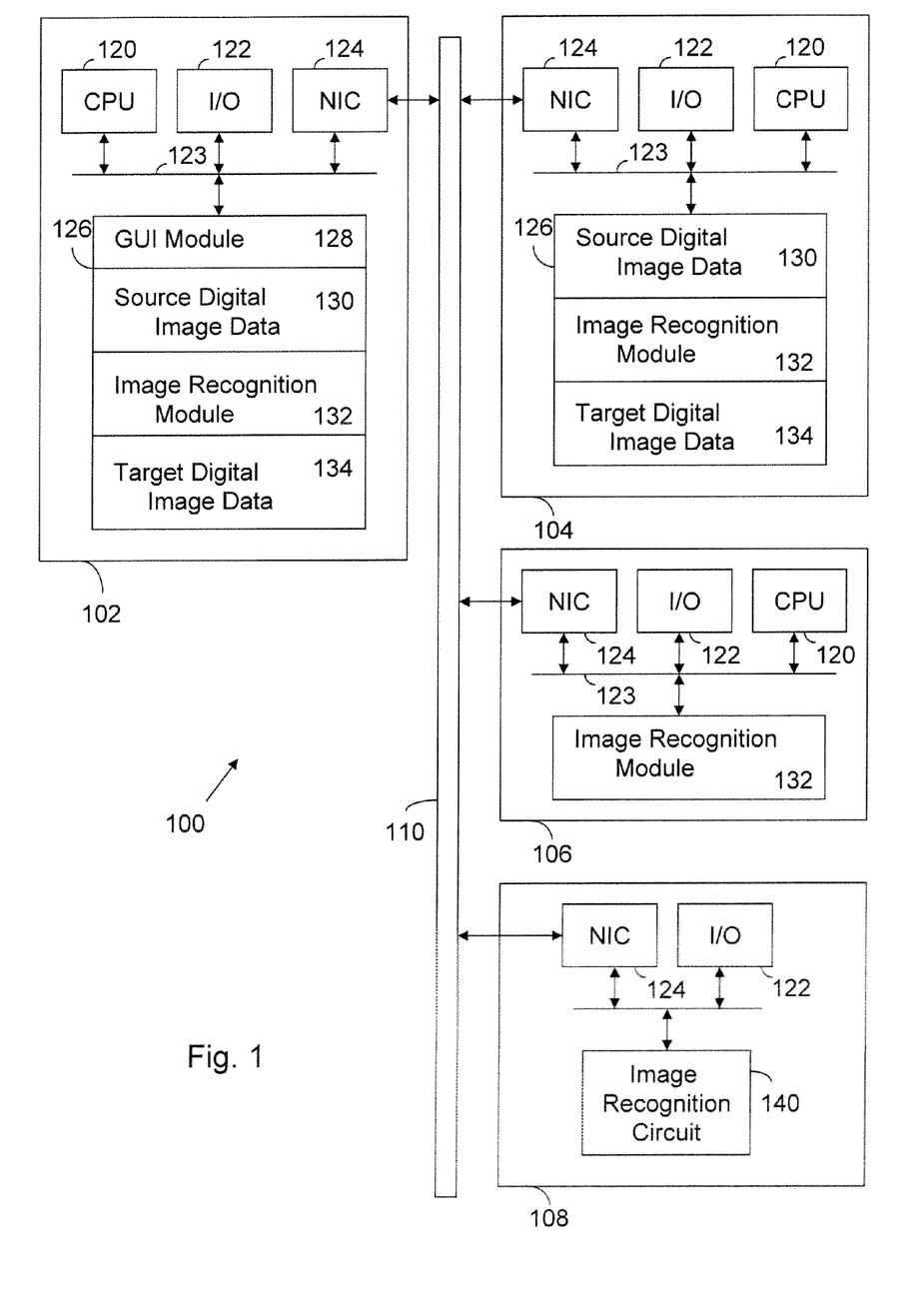
FIG. 1 illustrates a computer network configured in accordance with an embodiment of the invention.

FIG. 1 illustrates an exemplary network 100 configured in accordance with an embodiment of the invention. The network 100 includes a variety of computation devices, such as computers 102, 104, 106 and 108, which are linked by a communication channel 110, which may be any wired or wireless communication channel. Computer 102 includes standard components, such as a central processing unit (CPU) 120 and input/output (I/O) devices 122, which are connected via a bus 123. The input/output devices 122 may include a keyboard, mouse, display, printer, and the like. Also connected to the bus 123 is a network interface circuit (NIC) 124. The NIC 124 supports communications within a networked environment. The invention may be implemented in a networked environment or on a standalone basis.

A memory 126 is also connected to the bus 123. The memory 126 stores executable code to implement operations of the invention. The memory 126 stores a graphical user interface (GUI) module 128. The GUI module 128 includes executable instructions to generate an input user interface to receive a group of user-specified search image points within a digital image. In addition, the GUI module 128 includes executable instructions to provide an output user interface to present digital image search results.

The memory 126 also stores source digital image data 130. The source digital image data 130 may be image data that a user wants to process to find related image data. The source digital image data 130 may be on computer 102 or another computer within the network 100, such as computer 104.

The memory 126 also stores an image recognition module 132. The image recognition module 132 processes user-specified search image points to find related digital image content, as discussed in detail below.

Finally, the memory 126 also stores target digital image data 134. The target digital image data 134 is searched by the image recognition module 132 to find the best digital image content corresponding to the user-specified search image points. The target digital image data 134 may be a single digital image file but is typically a set of target digital images.

Computer 104 includes components of the type discussed in connection with computer 102. By way of example computer 104 may serve to supply source digital image data 130 and/or target digital image data to computer 102. Similarly computer 104 may operate as a computation slave implementing one or more of the tasks associated with the image recognition module 132.

Computer 106 may operate solely as a computation slave implementing one or more of the tasks associated with the image recognition module 132. Similarly, computer 108 may also operate as a computation slave. Computer 108 has an image recognition circuit 140 to implement one or more operations associated with the image recognition module. That is, instead of a software implementation of the image recognition module, the image recognition module circuit 140 implements the same functionality or a sub-set of functionality in an array of gates formed in a semiconductor material.

Computers 102, 104, 106, and 108 are illustrated to demonstrate the distributed nature of various embodiments of the invention. As discussed below, the techniques of the invention are very conducive to distributed processing. In particular, the invention is conducive to parallel processing and asynchronous processing across hybrid computer resources. The techniques of the invention may be implemented in any number of ways. It is the operations of the invention that are significant, not where or how those operations are implemented.

Figure 2:
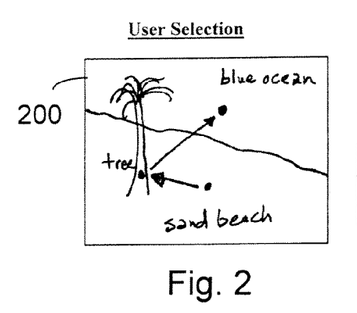
FIG. 2 illustrates user-specified search image points selected in accordance with an embodiment of the invention.
Figure 3:
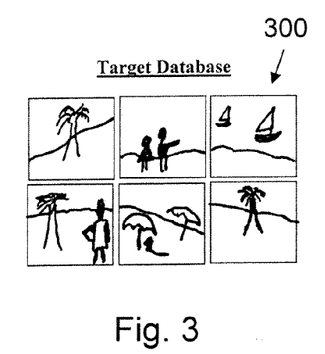
FIG. 3 illustrates target digital image data in the form of a set of target digital images that may be processed in accordance with an embodiment of the invention
Figure 4:
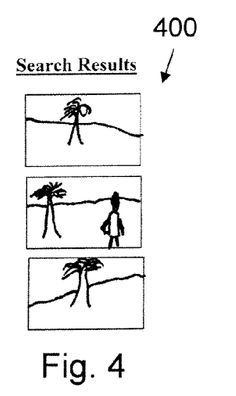
FIG. 4 illustrates digital image search results produced in accordance with an embodiment of the invention

FIG. 2 illustrates a GUI 200 with an image that includes a sand beach, a tree and a blue ocean. The GUI module 128 may be used to supply this image, which is an instance of source digital image data 130. Standard GUI techniques (e.g., point and click) allow a user to serially select points of interest in the source image. The serially selected points of interest are processed against digital image data, such as the target image database 300 shown in FIG. 3. Search results 400, such as those shown in FIG. 4, are then provided. The search results may be supplied through an output user interface associated with the GUI module 128.

In one embodiment of the invention, search or recognition results are made available incrementally after each point selection, and the selection of the next point is based on the current results and the user's understanding of what is important to further refine the search or recognition task request. Alternatively, the user's selection of points and the presentation of results can be conducted asynchronously: the user may select several points then request results of that selection; the user may trace through key features and allow the computer to select the salient points; etc.

As each new point is selected serially by the user, the collection of points selected is represented by an input trajectory, and it is matched for "best fit" with potential trajectories representing similar image content in the target digital image data using the image recognition module 132. The matches are then ranked for best fit and presented as ranked search results.

Each point in the source image can be classified by a dominant feature, such as color, an edge, etc. Because of this, the user can allow the image recognition module 132 to identify the dominant feature type automatically. However, at the user's request, a specific feature type may be specified for processing. System level controls are possible; the user may be allowed to choose only points where a certain feature type is saliently present. In most cases, the image recognition module 132 only processes one feature type. As an example, when a simple border (edge) point is selected, the input trajectories and trajectories in the target digital image data being considered for 'best fit' get modified based on the edge orientation at that point, and color is ignored.

In all cases, the user selects the image points which he considers relevant to the search or recognition task. However, this invention provides for a great deal of flexibility in how the user tells the system to process each point. The user can request that the image recognition module process each point automatically by identifying the most salient feature. The user can dictate that only color be processed for a particular point, or that only a particular geometric feature be processed for a particular point. For a series of points, the user can choose a combination of features: the first point may be processed for color, the second for a border geometric feature, the third for color again, the fourth for a corner geometric feature, etc.

Figure 5:
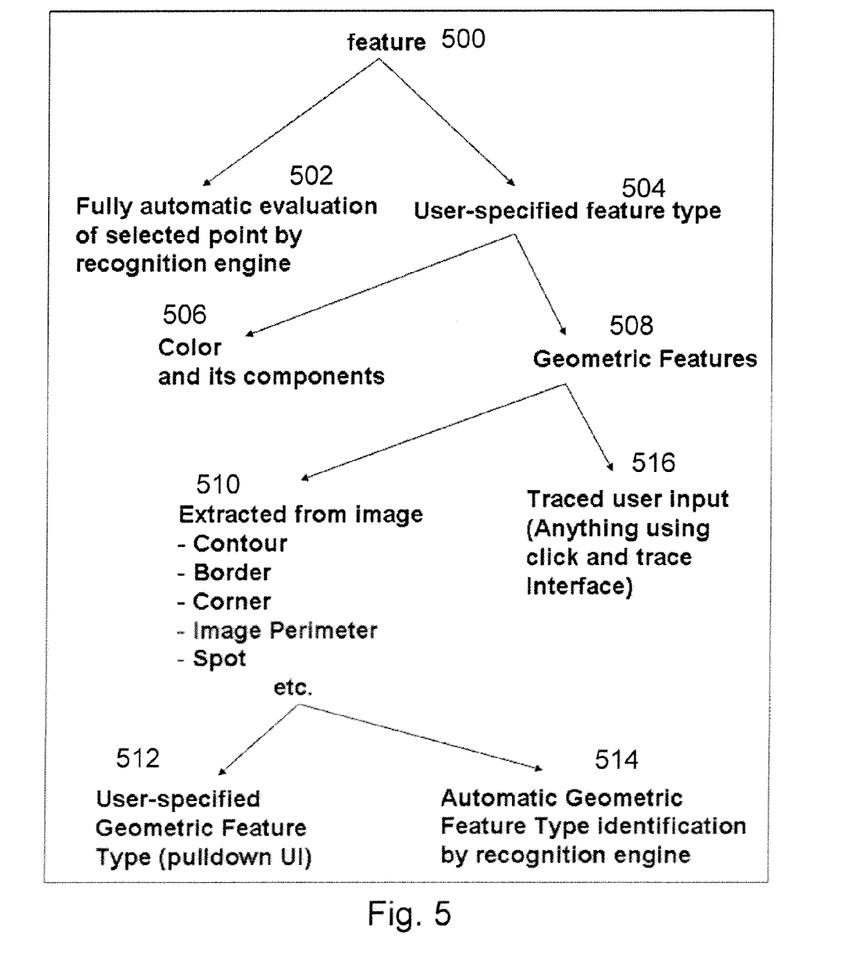
FIG. 5 illustrates a feature hierarchy that may be utilized in accordance with an embodiment of the invention.

FIG. 5 illustrates a hierarchy of features that may be processed in accordance with an embodiment of the invention. A feature 500 in a source digital image may be automatically evaluated 502 by the image recognition module 132. Alternately, the feature type may be user-specified 504. In such a case, color 506 and its components (e.g., hue and luminance) and geometric features 508 may be specified. Geometric features (e.g., contour, border, corner, image perimeter, spot) may be extracted 510 from an image. Extracted geometric features may be user specified, such as through a pull-down menu 512 or automatically identified 514 by the image recognition module 132. Geometric features may also be traced 516 through a click and trace interface.

The user interface may be configured to restrict a user from selecting points in particular parts of an image or from selecting certain feature types. For example, in an embodiment where the target image database is comprised of black and white images, a user may be restricted from using color as a feature. Or, in an embodiment where image perimeter information is irrelevant to the defined search tasks, a user may be restricted from selecting an image perimeter feature. This functionality may be part of the GUI module 128 and/or the image recognition module 132.

Figure 6:
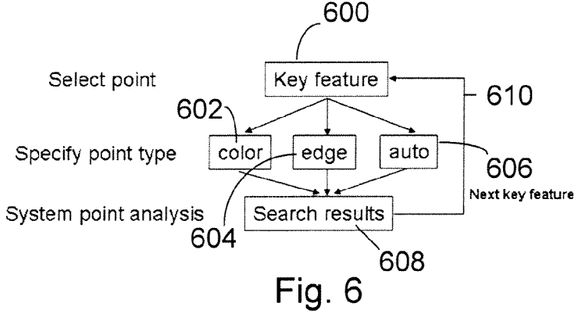
FIG. 6 illustrates point type specification for features processed in accordance with an embodiment of the invention.
Figure 7:
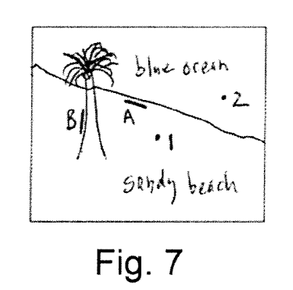
FIG. 7 illustrates digital image data processed in connection with the operations of FIG. 6.

FIGS. 6 and 7 illustrate processing associated with the selection of a point (key feature). In this example, a first point associated with a feature 600 is selected, as shown in FIG. 6. Consider the example of FIG. 7 where the first point is point 1 associated with a sandy beach. The user may then associate this point (e.g., through a pull-down menu) with a color 602 to produce search results 608. As shown in FIG. 6, the next key feature is then selected via feedback loop 610. In this example, point 2 is selected and is associated with a different color 602—blue. This produces a different set of search results 608. The process may then be repeated, for example to characterize an edge 604, such as edge A and edge B in FIG. 7. Instead of the user specifying the point type, the image recognition module 132 may be configured to automatically designate a point type and/or a geometric feature, as shown with block 606 of FIG. 6. In this embodiment, the geometric features are stored in pre-computed feature maps associated with the image recognition module 132. As a point in the source image is selected by the user, the image recognition module 132 checks the presence and strength of each geometric feature at that location and selects the most salient one. In a slightly different embodiment, geometric features are automatically detected without an exact user selection of the correct feature location in the source image. The geometric features are then identified and processed using the same pre-computed feature map approach. After the feature type is specified, search results 608 are produced and the process may be repeated via feedback loop 610.

Figure 8:
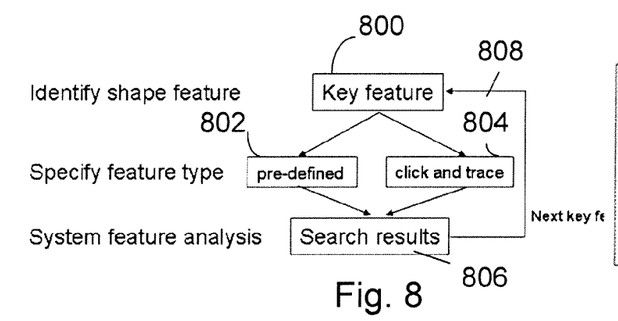
FIG. 8 illustrates feature type specification utilized in accordance with an embodiment of the invention.
Figure 9:
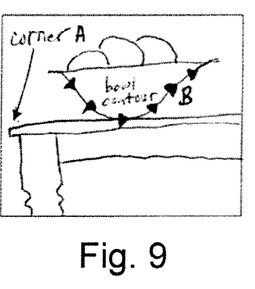
FIG. 9 illustrates digital image data processed in connection with the operations of FIG. 8.

FIGS. 8 and 9 illustrate processing in which the user is given flexibility to select his own geometric features, either from a pre-defined list (e.g., by selection from a pull-down menu) or by a more freeform 'click and trace' approach. Similar to FIG. 6, in FIG. 8 a key feature is identified 800 and then the feature type is specified. In the example, the feature type is pre-defined 802 or is specified through a click and trace operation 804. After the feature type is specified, search results 806 are produced and the process may be repeated via feedback loop 808.

Referring to FIG. 9, the user could use a mouse to highlight corner A of the object in the image and instruct the computer that this is a corner feature by selecting it from a pre-defined list. Alternatively, the user could use a mouse to click and trace corner A or any other geometric feature such as a particular contour, like contour B of FIG. 9.

The image recognition module 132 can facilitate automatic geometric feature detection and identification. In this embodiment, the geometric features are stored in pre-computed feature maps. As a user clicks and defines a trace in the source image, such as trace. The image recognition module 132 checks the presence and strength of geometric features along the trace and detects and selects the most salient ones. This automatic process can accommodate slight inaccuracies in the user's click and trace selection. For example, when a border is traced, an inaccurate trace drawn by a user can be automatically snapped to the nearest border in the source image.

Figure 10:
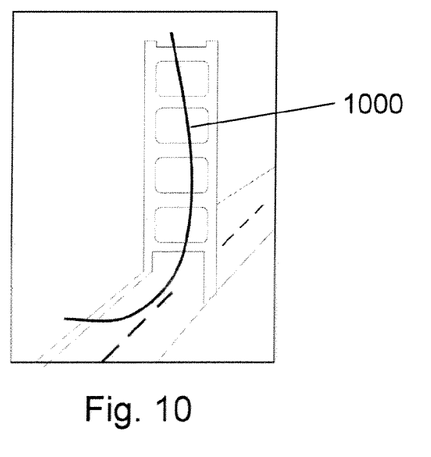
FIG. 10 illustrates a trace operation utilized in accordance with an embodiment of the invention.

FIG. 10 illustrates the use of a click and trace operation to define a color path 1000. In this example, the user focuses on color only and uses the click and trace interface to define salient color features. The image recognition module 132 identifies salient color features along the traced color path 1000. In this example, the image recognition module 132 evaluates the following: the objects' borders are not characteristic for the objects, because they are a mixture of somewhat stable object color (e.g., the bridge color) and highly variable background color (e.g., the backdrop behind the bridge); the points near the borders, on the other hand, are preferable because they define the dimensions and shape of the scanned object. Implementing these requirements, the image recognition module 132 automatically preferentially selects the points near the borders but within a safe distance from them to avoid the transitional color mixture.

Figure 11:
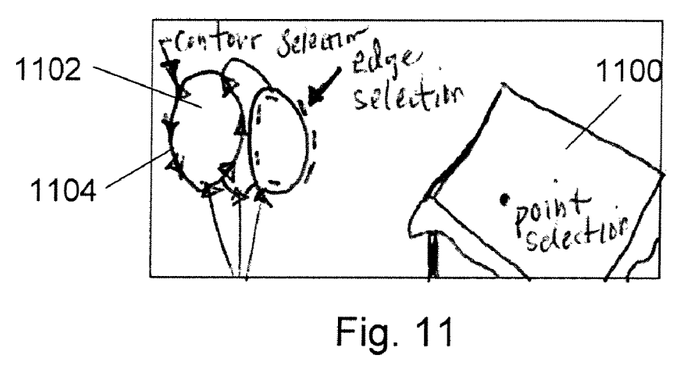
FIG. 11 illustrates contour, edge and color feature point selection techniques that may be utilized in accordance with embodiments of the invention.

The image recognition module 132 may also be configured to process color, geometric features or a combination thereof. In this embodiment, the image recognition module 132 allows the user to focus on any combination of color features and geometric features. The party photograph in FIG. 11 can be used to illustrate this concept. For instance, if the user wants to retrieve images from the party when the table 1100 is covered by a tablecloth of a particular color, then a point from the tablecloth image should be selected for color evaluation. If the user wishes to find images with objects that have a characteristic shape but where color is not important, such as searching for party balloons 1102, then the user selects points on the balloon's edges 1104 to sample its shape rather than its color. The user can also use a click and trace mouse stroke to outline the balloon's shape.

Figure 12:
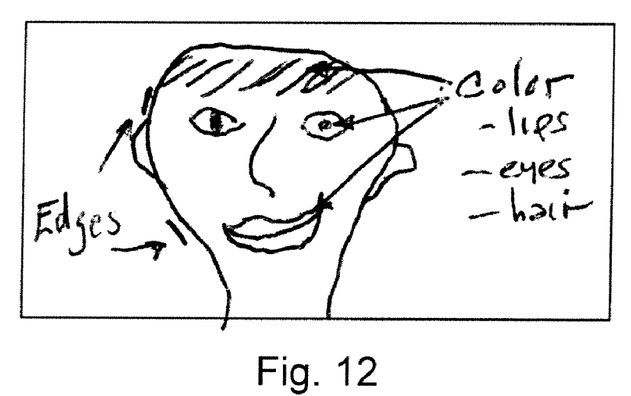
FIG. 12 illustrates facial feature processing utilized in accordance with embodiments of the invention.

The image recognition module 132 may also be configured for automatic point selection. In some tasks (such as facial recognition) automatic selection of optimal color and geometric features is possible. Faces all have the same salient features in the same approximate locations (and the same spatial relationships). This means that the image recognition module 132 can drive automatic feature detection and identification. In this embodiment, as shown in FIG. 12, facial edges and/or the color of lips, eyes and hair may be automatically identified. Thus, in this example, user selected points are not necessary since the features and their spatial relationships are similar and predictable.

The image recognition module 132 can provide automatic feature selection for any application where key features and their spatial relationships are highly similar. Two other important commercial examples are: 1) finding 'similars' when managing commercial photography databases (e.g., photos that are almost identical but have been cropped, re-colored, re-scaled, converted to black and white, or even slightly different shots taken during a single photo shoot of a particular subject); and 2) finding corporate logos and brand labels, such as an application that look in databases or across the web for instances of these logos and brand labels.

Figure 13:
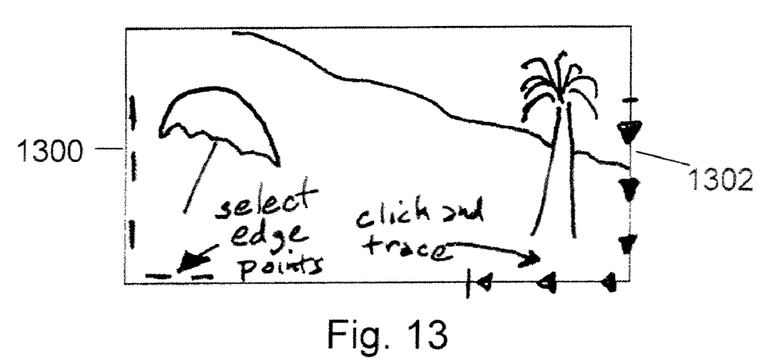
FIG. 13 illustrates edge selection and click and trace operations of the image perimeter utilized in accordance with embodiments of the invention.

The image recognition module 132 may also be configured to define search tasks using an image perimeter. In some image search and recognition tasks, the position of a sought object relative to the image perimeter is important. If this is the case, the relevant points in the image perimeter can also be selected. The user, after sampling points of interest on the object, may select one or more image perimeter points and define them as border (or edge) points, or click and trace a mouse along the perimeter. The matches from the target digital image data are restricted only to those images that position the object within the image perimeter in the same manner as in the source image. For instance, if the user wants to find a photograph with a similar composition, she samples the appropriate image perimeter points. FIG. 13 illustrates the selection of edge points 1300 and the click and trace 1302 of an image perimeter. In an alternate embodiment, a check box for the whole image perimeter can be selected through a pull-down menu.

Figure 14:
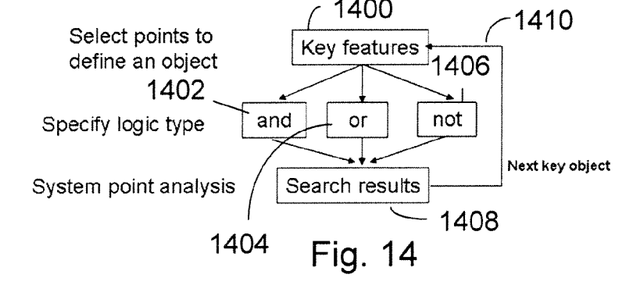
FIG. 14 illustrates Boolean logic operations utilized in accordance with an embodiment of the invention.
Figure 15:
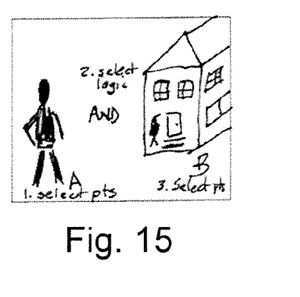
FIG. 15 illustrates digital image data processed in connection with the operations of FIG. 14.

The GUI module 126 and/or the image recognition module 132 may be configured to incorporate Boolean logic to refine a search. For example, sometimes a user may be looking for a certain set of objects to be present (or absent) in an image while the relative position of these objects is not important. The invention allows the use of logical functions such as AND, OR and NOT that logically (rather than spatially) relate the objects. FIG. 14 illustrates feature selection 1400 and then assignment of a Boolean value such as AND 1402, OR 1404, or NOT 1406. One or more of the Boolean conditions is then used to produce search results 1408. For instance, if the user wants to find instances of a certain person near a certain house, as shown in FIG. 15, the relative distance between the person and the house in the source image he is using may be irrelevant to him. The user can instruct the matching process to ignore these differing distances by using the AND logical function 1402. He starts matching by selecting a sufficient number of points from the person, then clicks on the AND condition 1402 to start new matching by selecting points from the house in the same (if the house is present there) or different image. The use of the AND condition keeps the interactive results of these two recognition matching processes separate, but then combines the results for the search task by scoring highly only the images that have successful matches for both objects. The feedback loop 1410 may then be used to repeat the Boolean condition processing.

The image recognition module 132 may be configured to process geometric features for non-color images. The previous examples discussed color images. Using geometric features, the techniques of the invention can also work with black and white (or grayscale) images and even sketches. A geometric features-only approach can also be applied to a sketch as the source image, so that search and recognition results from a target database could include similar sketches, similar black and white images, or similar color images.

Most of the applications described herein are image search applications, where a source image is used as a starting point to look for similar image content in target image data, usually a database of images. The object detection embodiment is slightly different. In these embodiments, an object library of stored templates is kept to define the objects that are of interest to a particular user. These templates are comprised of example images of the objects and the stored feature selections that best represent them. This object library essentially becomes the target image database, and when a source image is introduced, the object detection task is to detect instances of these objects of interest in this source image. The invention and the complementary image recognition module accomplish this task by evaluating the source image and searching for matches to the target database—the stored object templates in the object template library. This approach is particularly powerful when automatic point selection is possible in the source image, as described above Those skilled in the art will appreciate that the techniques of the invention are equally applicable to video search and recognition. In particular, the techniques of the invention may be applied to still images associated with video clips.

Those skilled in the art will appreciate that the disclosed techniques may be used in any number of applications, including but not limited to:

- Image and video search, by submitting a source image and searching entire databases of images (or still images originating from video) for similar images
- Image and video search, by submitting a source image and searching the world wide web for similar images (or still images originating from video)
- Computer vision and pattern recognition, by evaluating images (or still images originating from video) and matching them to similar objects in a template library
- Security and authentication, such as facial recognition applications to search large databases of images and video for faces similar to known terrorists
- Object detection in surveillance and reconnaissance, such as automated searching of large databases of images and video for images containing objects similar to suspicious (e.g., dangerous or suspect) objects stored in a template database.

Figure 16:
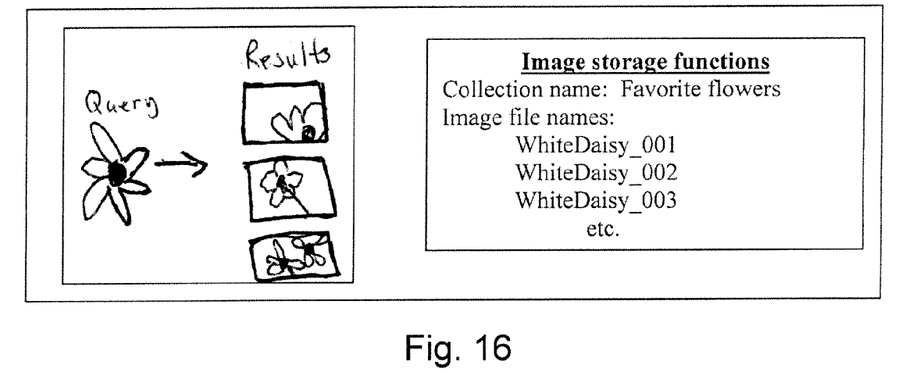
FIG. 16 illustrates image cataloging associated with an embodiment of the invention.

FIG. 16 illustrates the use of the techniques of the invention to find shots of daisies in a garden so that they can be cataloged in one location for future reference. In particular, a user performs a visual search of her own design to find similar flowers. This application is then extended to add productivity and ease of use functions by manipulating these images as a group rather than one image at a time. Examples are: 1) tagging the group of images with common keywords (descriptors); 2) putting the entire group of images in a folder with one simple action; and 3) auto-populating the file names of these groups (e.g. WhiteDaisy_001, WhiteDaisy_002, WhiteDaisy_003, etc.). Overall, managing these assets based on user defined similarity as a group is much more efficient than managing one image at a time. These operations are supported by the image recognition module 132 and/or the GUI module 128. This cataloging capability combined with the face recognition capability discussed above can enable automatic cataloging of family members in a home computer photo management application.

Another example application of the techniques of the invention is to an Internet-based photo sharing group that uses the invention to search across the group's shared photo collections to find the best shot of the Golden Gate Bridge out of all of the photos that the group members have taken. For example, these photos may be distributed across computers 102 and 104 of FIG. 1. Indeed, these photos may be distributed across any random number of computers.

Figure 17:
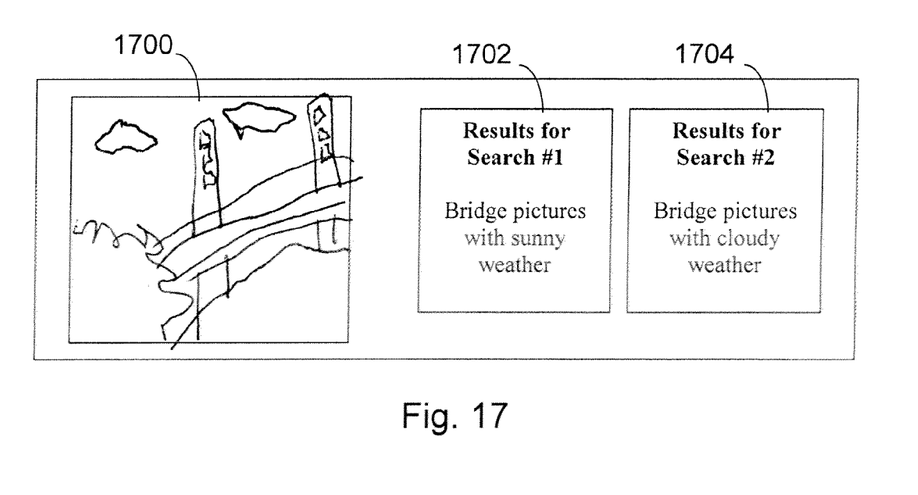
FIG. 17 illustrates image cataloging associated with another embodiment of the invention.

The image recognition module 132 helps a member find the very best photo within a wide assortment. The member starts the process by picking a starter image that is approximately what is needed. This starter image may be of the bridge taken from a particular vantage point, for example image 1700 of FIG. 17. The member then picks key points on the bridge to define essential geometric features and colors. All pictures of the bridge from the same viewing perspective will appear (e.g., images 1702 and 1704). The search can then be further refined. Suppose the starter picture has some blue sky and a few clouds. The user pick points in the blue portion of the sky to find pictures with sunny weather. Alternatively, the user could pick points in the clouds, which will drive a search for pictures with cloudy weather.

Figure 18:
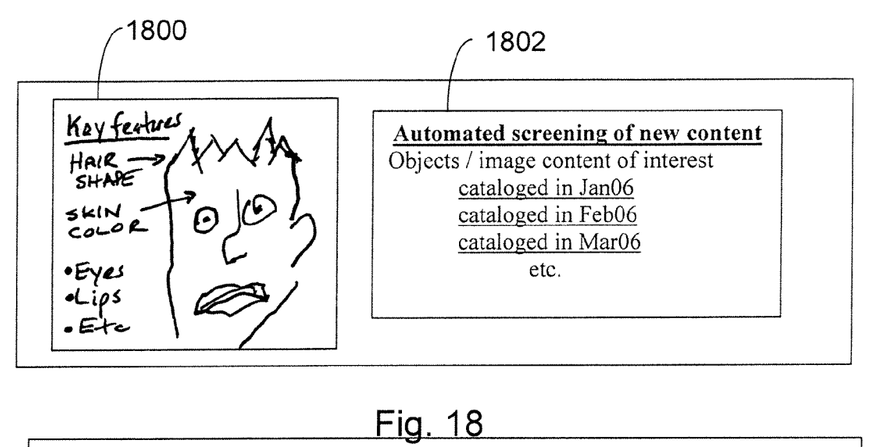
FIG. 18 illustrates automated screening associated with an embodiment of the invention.

The image recognition module 132 may also be configured to create automated tasks to look for objects of interest or other image or video content of interest. These automated tasks are invaluable in monitoring target databases with constantly changing content. Examples include 1) surveillance video taken from stationary cameras on trains and buses performing automated monitoring for suspicious packages, 2) monitoring the Internet for fraudulent usage of proprietary (e.g., copyrighted) image or video assets, 3) management and monitoring of instances of key proprietary assets, such as images of trademarks (e.g., logos) within large corporate databases, and 4) periodic automated searches of media and entertainment assets of instances of accidental or intentional product placement (provides implicit advertising of a particular product). FIG. 18 illustrates an application of this type. In particular, FIG. 18 includes a characterization 1800 of proprietary content (e.g., Bart Simpson). The image recognition module 132 automatically screens for this proprietary content to produce a catalog of content 1802.

Figure 19:
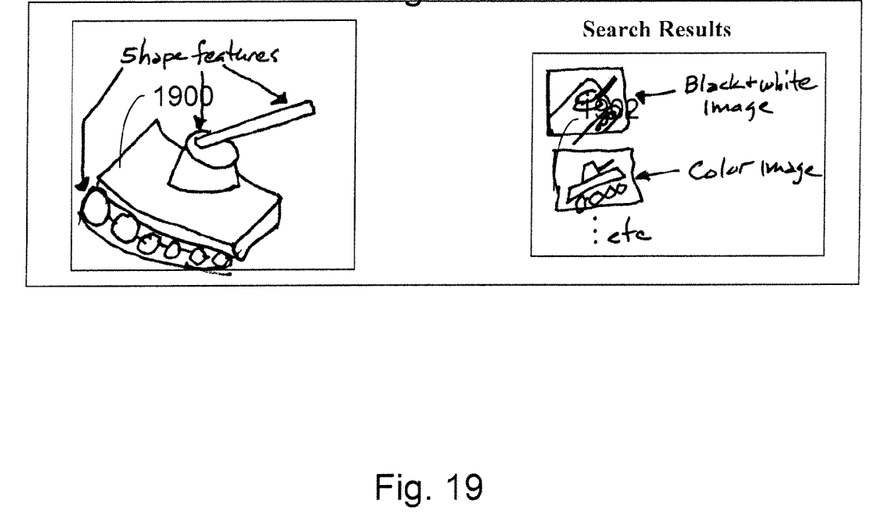
FIG. 19 illustrates the processing of a mixture of black and white, grayscale, low color, and color military image content in accordance with an embodiment of the invention.

The image recognition module 132 may be configured to process black and white or low color images. Geometric features can be used for exclusively black and white (or grayscale) target image databases, or for databases where there is a mixture of black and white and color images. Additionally, this capability is especially useful for military reconnaissance and other security and defense applications, which have many types of black and white and specialized low-color images. FIG. 19 illustrates a military image 1900 with specified geometric (shape) features. The image recognition module 132 generates search results 1902 with corresponding shape features.

The discussion up to this point has focused on the specification of search image points to define a search or recognition task and various techniques and applications for the processing of those search image points. The foregoing techniques may be used in connection with a number of image recognition techniques. The following discussion is directed toward particularly useful image recognition techniques that may be used in accordance with an embodiment of the invention.

Figure 20:
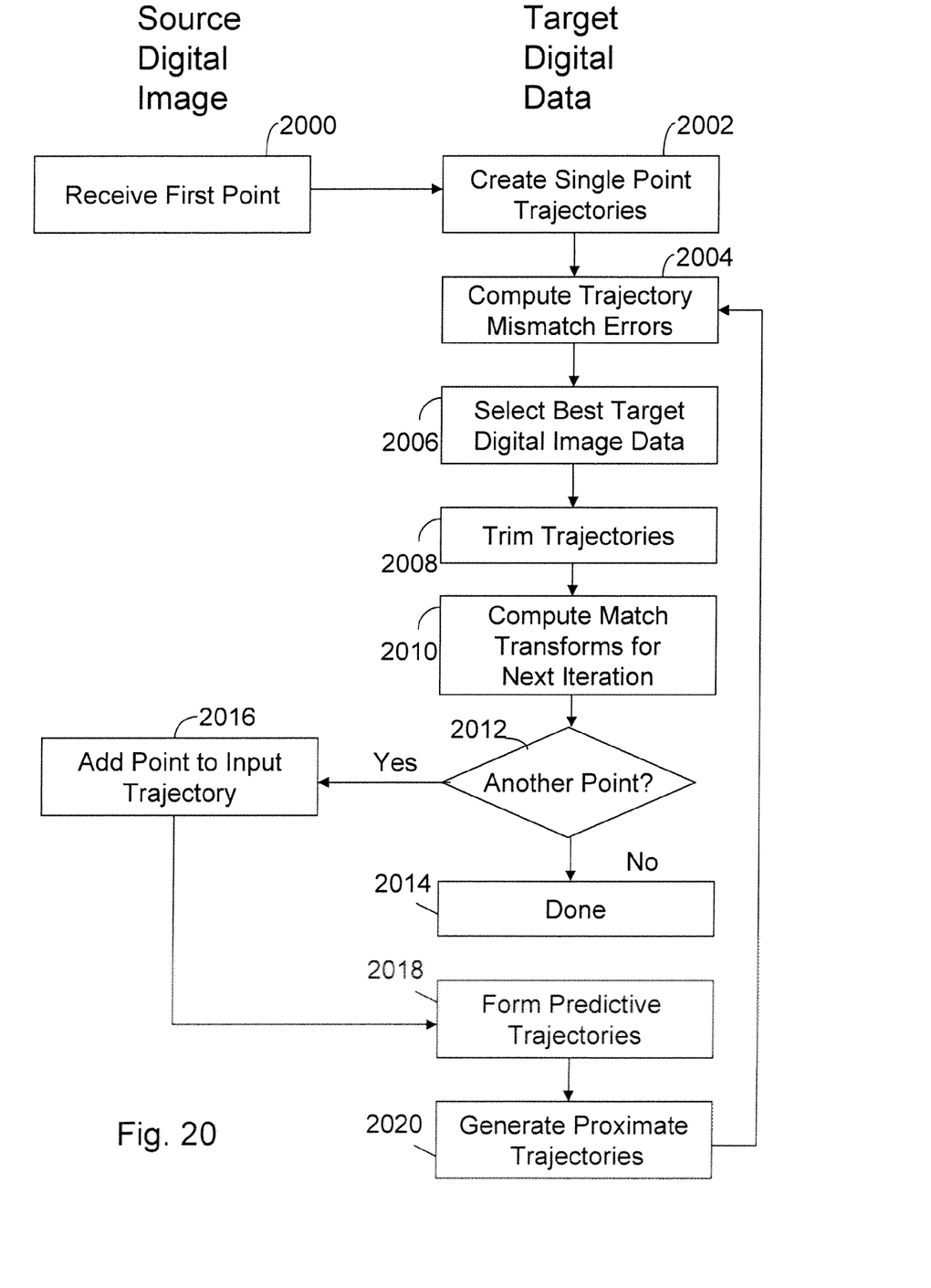
FIG. 20 illustrates processing operations associated with an embodiment of the invention.

FIG. 20 illustrates processing operations associated with an embodiment of the image recognition module 132. These operations implement a trajectory matching cycle. An initial point is received from a source digital image 2000. Single point trajectories are then formed in the target digital image data 2002, as discussed below. Trajectory mismatch errors in the target digital data are then computed 2004. Various techniques to implement this operation are discussed below. The best target digital image data are then selected 2006. The selection may be based upon ranked results. Image search and recognition, and object detection as well, endeavors to find the best target digital image data based on the smallest trajectory mismatch error between possible target trajectories and the input trajectory in the source image. When a search process results in ranking individual images in a target image database, the trajectory in each image with the smallest mismatch error is selected to represent that image in the ranking process. These representational trajectories for each image then compete in the ranking process, and the images with smaller representational trajectory mismatch errors receive higher rankings in the search results.

The following two operations are taken to prepare for the receipt of the next selected point and the next iteration of the trajectory matching cycle. Trajectories in the target digital data are trimmed 2008, as discussed below. Match transforms for the next iteration are then computed 2010. A variety of match transform types may be utilized in accordance with embodiments of the invention, as discussed below.

If there are no more points to process (NO at decision block 2012) then processing is completed 2014. If an additional point is available to process (YES at decision block 2012), the additional point is added to the input trajectory of the source image. Predictive trajectories are then formed in the target digital image data 2018, as discussed below. Proximate trajectories are then generated 2020, as discussed below. The processing then returns to block 2004.

In some embodiments, the best target digital image data can be selected 2006 after trimming the trajectories 2008; in others, the best target digital image data can be selected 2006 after computing the match transforms for the next iteration 2010. In these embodiments, later selection of the best target image data 2006 can reduce computational load.

Figure 21:
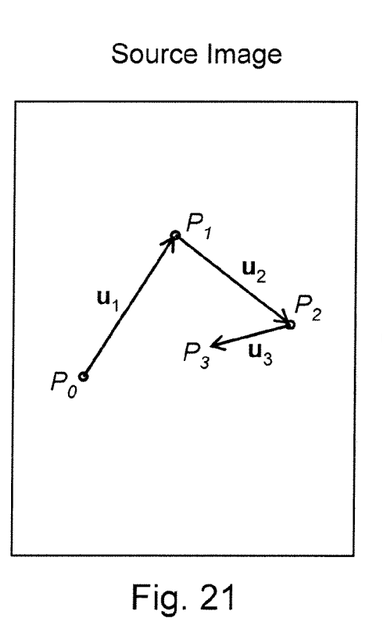
FIG. 21 illustrates input trajectory processing in the source image associated with an embodiment of the invention.

Thus, the image recognition module 132 receives one by one a sequence of t+1 locations $\{P_k\}_{k=0:t}$ from a source image. These locations are chosen to characterize in the most unique way the part of the source image to be matched with images in the target digital image data. Because the locations are ordered in time, they form a trajectory $U_t = \{u_k\}_{k=1:t}$ comprised of t vectors connecting the locations in their order, as shown in FIG. 21. As discussed above, the points forming the trajectory can be chosen by a user based on his/her task and experience, produced by an automatic location selection procedure, or the input trajectory itself can be retrieved from a bank of stored trajectories.

In addition to the sequence of locations, the image recognition module 132 also receives local feature descriptors associated with these locations. Examples of such descriptors can be luminance, hue, saturation, presence of contour or border features and their orientation, presence of a spot, etc. We denote by $S(P_k)$ a list of the local feature descriptors associated with the point $P_k$.

Trajectories are used as a proxy for similarity or "best fit". In an ideal world, the image recognition module 132 matches the input trajectory with vertices $\{P_k\}_{k=0:t}$ and connecting vectors $U_t = \{u_k\}_{k=1:t}$ from the source image with all possible trajectories with vertices $\{Q_k^n\}_{k=0:t}$ and connecting vectors $V_t = \{v_k\}_{k=1:t}$ in the target digital image data. (The upper index n denotes the trajectory number; it will be occasionally omitted to avoid clutter when the trajectory number is unimportant.) Examples of such possible trajectories are given in the Target Image of FIG. 22. Thus, a selected trajectory in the source image gets matched with all possible trajectories with different locations, orientations and shapes in the target image. Local feature descriptors in the source image $S(P_k)$ associated with input trajectory locations are also considered, comparing them to their corresponding local feature descriptors $S(Q_k)$ in the trajectories in the target image data.

Figure 22:
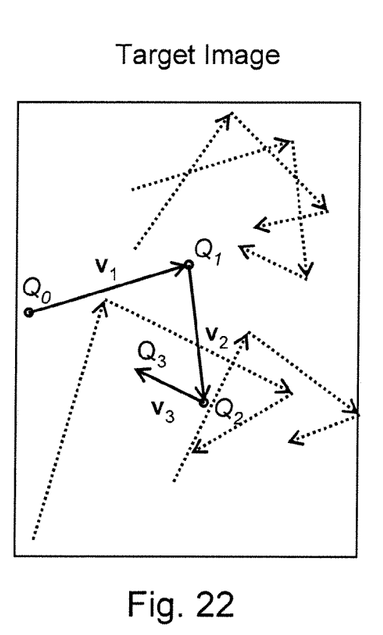
FIG. 22 illustrates target image trajectory processing associated with an embodiment of the invention.

In one embodiment of the invention, a comparative method is employed between the input trajectory in the source image and the universe of possible trajectories in the target digital image data. For each trajectory $V_t = \{v_k\}_{k=1:t}$ in the target image data we compute a trajectory mismatch error 2004 between it and the input trajectory $U_t = \{u_k\}_{k=1:t}$ in the source image.

The trajectory mismatch error computation 2004 starts with an estimation of the match transform between two trajectories. The transform type is selected from various classes of transforms, which best fits a particular matching task. For different matching tasks such classes can include, but are not limited to, planar, linear and projective transforms. For linear transforms, for example, this transform $Z_t$ is a solution of the system of linear equations:

$$v_k = Z_t \cdot u_k, \tag{1}$$

where tk=1: .

Computing match transforms is extremely computationally intensive. In FIG. 20 the match transform is computed after trajectories are trimmed 2008. Computing the match transform for the next iteration of the trajectory matching cycle 2010 provides an adequate estimate of the match transform needed for that next iteration of the trajectory matching cycle.

A trajectory mismatch error is computed 2004 for a given match transform estimate. The overall squared trajectory mismatch error E is comprised of two components: the squared error due to geometric mismatch $E_{geom}$ and the squared error due to feature descriptor mismatch $E_{descr}$. In one of many possible implementations, the square of the geometric mismatch error can be computed with the following formula:

$$E_{geom}(U_t, V_t, Z_t) = \sum_{k=1}^{k=t} \|v_k - Z_t \cdot u_k\|^2. \tag{2}$$

Attention now turns to the calculation of feature descriptor errors. There are isotropic feature descriptors, like color, where feature orientation is not a factor. For anisotropic features, like borders (edges), feature orientation is an important factor. Luminance is a color component and is an isotropic feature. Similarity between two points with respect to luminance can be defined by the distance between two luminance values:

$$\text{dist}(L_1, L_2) = |\log(L_1) - \log(L_2)|, \tag{3}$$

This roughly matches human perception (perceptual response to luminance known as lightness is roughly logarithmic).

Now consider anisotropic feature descriptors; a key component is feature orientation and the match transform Z comes into play. Using a simple border (edge) as an example, the distance can be computed as an angle between border orientations. If $a_1$ and $a_2$ are normal vectors to the borders and the match transform is Z, the distance is given by the angle between the predicted border orientation $Za_1$ and the true orientation $a_2$ in the target image:

$$\text{dist}(a_1, a_2, Z) = \left| \arccos\left( \frac{a_2' \cdot Za_1}{\|a_1\| \cdot \|a_2\|} \right) \right|. \tag{4}$$

Thus, for isotropic descriptors like color and its components, the distance does not depend on the match transform; for anisotropic descriptors like edges, it does. Specific ways of computing distances between different descriptors are known in the art. The squared mismatch error between the sets of descriptors $E_{descr}(P,Q,Z)$ in two matched locations P and Q is computed as a weighted sum of the squared distances for each component descriptor. Weights may be assigned to the descriptors using any number of techniques. The squared feature descriptor mismatch error between two trajectories $U_t$ and $V_t$ is the sum of the squared feature descriptor mismatch errors for each point:

$$E_{descr}(U_t, V_t, Z_t) = \sum_{k=0}^{k=t} E_{descr}(P_k, Q_k, Z_t) \tag{5}$$

Finally, the overall squared trajectory mismatch error between two trajectories is computed as a sum of the geometrical and feature descriptor mismatch components:

$$E(U_t, V_t, Z_t) = E_{geom}(U_t, V_t, Z_t) + E_{descr}(U_t, V_t, Z_t) \tag{6}$$

We will denote the squared mismatch error of the n-th trajectory after processing of t points by $E_t^n = E(U_t, V_t^n, Z_t^n)$.

The method of comparing trajectories described in the trajectory matching cycle in FIG. 20 recursively updates trajectories in the target images when a new point of interest $P_{t+1}$ is added to the input trajectory 2016 in the source image. This update extends the existing trajectories in the target image data by adding a new terminal point. Potentially, each target image trajectory, after adding a new point, can produce as many new trajectories as the number of pixels in the target image. Such an approach, however, would lead to an unacceptable waste of resources, because most of the target image trajectories would not have the slightest resemblance to the input trajectory. To maintain resemblance, the following 2-step updating process may be used.

1) The next segment in every existing trajectory is predicted based on the trajectory match transform: $v_{t+1} = Z_t u_{t+1}$. This segment, together with the previous segments, constitutes a predictive trajectory with a terminal point at $Q_{t+1}$ (block 2018 of FIG. 20).
2) This predictive trajectory generates a multiplicity of new proximate trajectories, which share the first t+1 points $\{Q_k\}_{k=0:t}$ with it and the last point is within a certain proximity of its terminal point $Q_{t+1}$ (block 2020 of FIG. 20).

Figure 23:
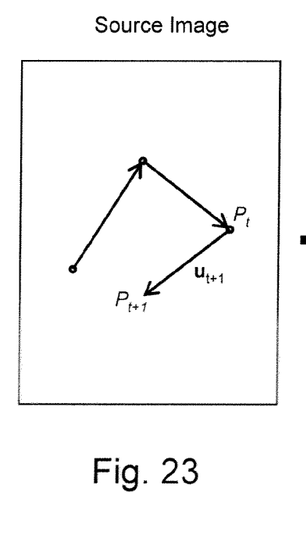
FIG. 23 illustrates input trajectory processing in the source image of a new point of interest.
Figure 24:
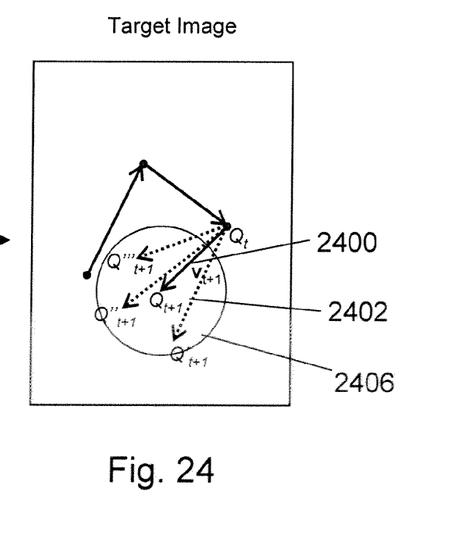
FIG. 24 illustrates target image trajectory processing after the addition of a new point of interest.

This trajectory updating process is illustrated in FIGS. 23 and 24. FIG. 23 illustrates the addition of point to the input trajectory (block 2016 of FIG. 20). FIG. 24 illustrates a solid line predictive trajectory 2400 with terminal point $Q_{t+1}$ (block 2018 of FIG. 20) and dashed line proximate trajectories 2402 (block 2020 of FIG. 20). The point $Q_{t+1}$ is the exact prediction of the existing trajectory shown by the solid arrow lines. The points $Q'_{t+1}$, $Q''_{t+1}$ and $Q'''_{t+1}$ illustrate terminal points of a few proximate trajectories 2402 that test new transformations and locations. All proximate trajectories 2402 are identified by having terminal points within a certain proximity of $Q_{t+1}$, shown here by a circle 2406.

The described process of new trajectory generation in the target image data, comprised of forming predictive trajectories 2018 and then generating proximate trajectories 2020, is a basis for unique levels of adaptability of the overall trajectory matching cycle described in FIG. 20. First, it tests new locations. If for instance, the local feature descriptors in the point $Q_{t+1}$ in FIG. 24 do not match those in $P_{t+1}$, but in $Q''_{t+1}$ they do match, then the mismatch error of the trajectory ending with $Q''_{t+1}$ may become lower than the mismatch error for $Q_{t+1}$. Second, new trajectories test new match transforms. The match transform computed for the trajectory with the end point $Q''_{t+1}$ will be different than the match transform for $Q_{t+1}$. This combination of new location and new match transform at $Q''_{t+1}$ may reveal it as a better match than the predictive trajectory ending at $Q_{t+1}$.

Restricting the trajectories in the target digital data during updating does not resolve, however, the problem of exponential growth of their number as the input trajectory length increases. Therefore, as a new point is added and the length of the input trajectory increases, there is a need to discard trajectories in the target digital data that have little potential for becoming the best matches of the input trajectory from the source image. With this goal in mind we impose the following rules for the trajectories stored:

1) Each trajectory in the target image data is assigned to a pixel that coincides with the terminal point of the trajectory. Thus, as a trajectory gets extended, it gets assigned to a new terminal pixel.
2) Each pixel in the target image can be linked only to a limited number of trajectories (in many applications one trajectory is sufficient).
3) All target trajectories terminating at a certain pixel in the target image compete for that pixel; a limited number with a smallest trajectory mismatch error compared to the input trajectory will remain and the rest will be discarded.

Figure 25:
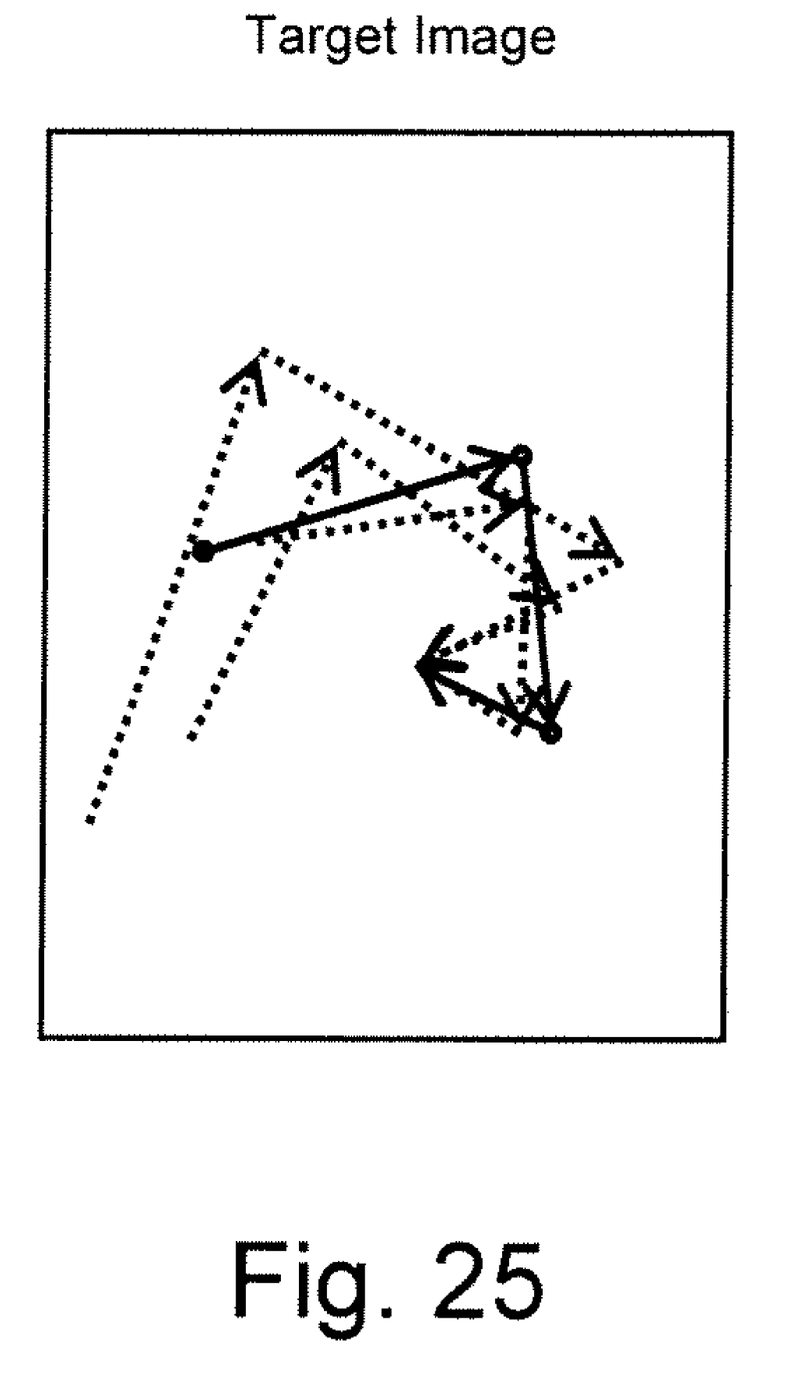
FIG. 25 illustrates target image trajectory mismatch processing associated with an embodiment of the invention.

The described rules are illustrated by FIG. 25, and guarantee that the number of preserved trajectories is not larger than a pre-defined multiple of the total number of pixels in the target images. This number limits the exponential growth of analyzed trajectories. These operations correspond to the trim trajectory operation of block 2008 of FIG. 20.

Now we have described in detail all elements of the trajectory matching cycle, which is executed when a new point of interest in the source image is selected. This cycle comprises the previously discussed operations of FIG. 20.

The first point to enter the cycle (block 2000 of FIG. 20) requires special treatment because when no point has been previously chosen in the source image, there are no trajectories to continue at that moment in the target image data. When the first point of interest is selected in the source image, it is matched with every point in the target image data. As a result, a single point trajectory is formed in every pixel of the target image data. The match of a single point is insufficient for constraining a unique transform such as the one described in Eq. 1; therefore, a default unity match transform is assigned to these single point trajectories, to be modified when more input trajectory points are selected.

The described trajectory matching cycle can be implemented in recursive fashion if some methods of approximation are used. The match transform can be computed precisely with the recursive scheme developed by Kohonen based on the Greville recursive formula for a Moor-Penrose matrix inversion (Kohonen, 1977). For the trajectory mismatch error, however, the exact update would require re-visiting every point on the trajectory and re-calculating the feature descriptor mismatch error for the newly computed match transform. Therefore, the current match transform is approximated by using the match transform calculated in the previous trajectory matching cycle for computing the trajectory mismatch error, as provided by this formula:

$$Err_{t+1}^n = Err_t^n + \|v_{t+1} - Z_t u_{t+1}\|^2 + \text{dist}_{descr}(P_{t+1}, Q_{t+1}, Z_t)^2 \qquad (7)$$

A recursive implementation allows each trajectory to be described by a fixed number of parameters. The major advantage of such an implementation is that it does not require storing every intermediate step. The variables needed to update the trajectories are:

1) a representation of the trajectory's current state provided by a few variables, and 2) new data from the input trajectory. The trajectory matching cycle is designed with parallel implementation and scalability in mind. The target data (or target image databases) can be split into fragments and reside on multiple computers; and search and recognition tasks using the trajectory matching cycle can be performed for each fragment independently. Moreover, if the selection of the input trajectory is such that the distance between subsequent points on it is short, the behavior of individual trajectories within a single target image can be accounted within a framework of finite element methods and implemented on a matrix processor, which further improves performance.

An embodiment of the invention includes a trajectory matching cycle which sequentially receives points from a source image and recursively updates the trajectories in the target image database. The memory required to store a target image trajectory is fixed; it does not depend on the number of segments in it. The number of trajectories is limited by the total number of pixels in the target data (or database of target images). These limits guarantee that the process described will always produce consistent results, with a predictable computational delay and no memory overflows.

Those skilled in the art will appreciate that the techniques of the invention may be applied to various applications including but not limited to:
  Computer vision and pattern recognition, by evaluating images (still or video) and matching them to similar objects in a template library
  Image and video search, by submitting a source image and searching entire databases of images (still or video) for similar images
  Image and video search, by submitting a source image and searching the world wide web for similar images (still or video)
  Character and word recognition, by evaluating printed and cursive handwriting samples and matching them to known templates
  Speech recognition, by matching spectrograms as two-dimensional patterns with known templates Thus, the invention provides an interactive method for allowing a user to conduct real-time recognition tasks including image search and object detection. The invention allows a user to take an image and interact with it to find non-identical images that are visually similar in some important way, as defined by the user. The method offers an unparalleled combination of flexibility, speed, and performance in image recognition and related search tasks.

The invention is novel in the way it allows a user to serially select the points in a source image that he considers of the greatest importance or relevance. This initiates a real-time trajectory matching cycle along this point selection, between the source image and a group of images in a target database. The matching process incrementally accommodates each new selected point by creating an input trajectory along the points selected in the source image and matching it for "best fit" with possible trajectories in the images of the target database. The point selection is based on the user's experience and expectations as to what image features might be critical for a fast and successful search process for similar images from the target database. The user may limit his search to a particular part of the source image by selecting points within relevant parts of the source image and by avoiding the irrelevant parts. Users quickly learn to employ efficient strategies for selecting points, and with experience, a very limited number of points (3-10) are sufficient for satisfactory search results.

The invention may be utilized in any number of forms. For example, a user can click and trace along features of interest and the image recognition module 132 can select salient points along that trace. The techniques of the invention can be applied to: image search tasks of the World Wide Web over the Internet; recognition tasks requiring object detection, or the matching of a source image to a template library of images; and similar search and recognition tasks for digital video.

An embodiment of the invention evaluates similarity between non-identical images. In this embodiment, a trajectory is introduced in a source image, comprised of a series of locations that define the image's features or objects of interest. This input trajectory is compared to multiple trajectories in the images from a target database, by computing a trajectory mismatch error for each pair. A target image is considered as containing features or objects of interest defined by the input trajectory in the source image when it has a trajectory whose mismatch error is sufficiently small to meet a match criterion. The proposed method provides a unique combination of capabilities and advantages, such as recursive processing of serially selected points, consideration of spatial relationships, high speed, and unparalleled flexibility in choosing types of match transforms. Because this method is equally capable of evaluating a variety of transforms, including planar, linear, and projective, it provides fast and reliable results in most computer-based recognition tasks (i.e. computer vision, understanding speech, and Optical Character Recognition).

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java. C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
  receive an input trajectory of serially selected points of interest within a source digital image;
  compute trajectory mismatch errors between the input trajectory and trajectories within target digital image data; and
  select the best target digital image data based upon the trajectory mismatch errors to establish refined target digital image data.

2. The computer readable storage medium of claim 1, wherein the target digital image data includes a set of target digital images.

3. The computer readable storage medium of claim 2, further comprising executable instructions to rank target digital images according to the smallest trajectory mismatch errors.

4. The computer readable storage medium of claim 1, wherein the best target digital image data includes individual locations within the target digital image data corresponding to an object of interest as characterized by the input trajectory.

5. The computer readable storage medium of claim 1, further comprising executable instructions to:
   initially receive a first selected point of interest within the source digital image; and
   create single point match trajectories within the target digital image data.

6. The computer readable storage medium of claim 1, further comprising executable instructions to augment the input trajectory with an additional selected point of interest within the source digital image.

7. The computer readable storage medium of claim 6, further comprising executable instructions to repeat, in response to the additional selected point of interest in the source image, the executable instructions to compute and select.

8. The computer readable storage medium of claim 1, further comprising executable instructions to recursively process trajectories within the target digital image data.

9. The computer readable storage medium of claim 8, further comprising executable instructions to predict new trajectory segments in the target image data based upon the additional selected point of interest in the source image, wherein the new trajectory segments and previous trajectory segments form predictive trajectories in the target image data.

10. The computer readable storage medium of claim 8, further comprising executable instructions to generate proximate trajectories in the target image data based upon the additional selected point of interest in the source image.

11. The computer readable storage medium of claim 10, further comprising executable instructions to trim the proximate trajectories to form selected trajectories.

12. The computer readable storage medium of claim 11, wherein the executable instructions to trim include executable instructions to assign each trajectory of the proximate trajectories in the target digital image data to a terminal pixel.

13. The computer readable storage medium of claim 12, wherein each terminal pixel is limited to a specified number of proximate trajectories.

14. The computer readable storage medium of claim 13, wherein the specified number of proximate trajectories correspond to the proximate trajectories with the smallest trajectory mismatch errors.

15. The computer readable storage medium of claim 13, wherein each terminal pixel is limited to a single proximate trajectory.

16. The computer readable storage medium of claim 1, further comprising executable instructions to compute trajectory mismatch errors in the target image data using a match transform.

17. The computer readable storage medium of claim 1, further comprising executable instructions to compare the input trajectory to proximate trajectories to compute geometric trajectory mismatch errors.

18. The computer readable storage medium of claim 1, further comprising executable instructions to compute feature descriptor mismatch errors.

19. The computer readable storage medium of claim 18, further comprising executable instructions to compute isotropic feature descriptor mismatch errors.

20. The computer readable storage medium of claim 18, further comprising executable instructions to compute anisotropic feature descriptor mismatch errors based upon a match transform.

21. The computer readable storage medium of claim 1, further comprising executable instructions to select a match transform type from a planar match transform, a linear match transform and a projective match transform.

22. The computer readable storage medium of claim 1, further comprising executable instructions to compute match transforms.

23. The computer readable storage medium of claim 22, further comprising executable instructions to compute a match transform that minimizes the mismatch error between the input trajectory and the trajectories within the target digital image data.

24. The computer readable storage medium of claim 1, further comprising executable instructions to automatically select points of interest within the source digital image.

25. The computer readable storage medium of claim 1, further comprising executable instructions to automatically select points of interest in facial features of the source digital image.

26. The computer readable storage medium of claim 1, wherein the executable instructions to compute trajectory mismatch errors are executed across distributed computation devices.

27. The computer readable storage medium of claim 1, wherein the executable instructions to compute trajectory mismatch errors are executed asynchronously across distributed computation devices.

28. The computer readable storage medium of claim 1, wherein the executable instructions to compute trajectory mismatch errors are executed in parallel across distributed computation devices.

29. The computer readable storage medium of claim 1, wherein the executable instructions to compute trajectory mismatch errors are executed across distributed computation devices owned by a plurality of users that permit the utilization of computation cycles.

30. The computer readable storage medium of claim 1, wherein the executable instructions to compute match transforms are executed across distributed computation devices.

31. The computer readable storage medium of claim 1, wherein the executable instructions to compute match transforms are executed asynchronously across distributed computation devices.

32. The computer readable storage medium of claim 1, wherein the executable instructions to compute match transforms are executed in parallel across distributed computation devices.

33. The computer readable storage medium of claim 1, wherein the executable instructions to compute match transforms are executed across distributed computation devices owned by a plurality of users that permit the utilization of computation cycles.

34. The computer readable storage medium of claim 1, wherein the computer readable storage medium is a first array of gates formed in a semiconductor material and the executable instructions to compute and select are implemented as a second array of gates formed in the semiconductor material.

* * * * *